US007632562B2

(12) United States Patent
Nair et al.

(10) Patent No.: US 7,632,562 B2
(45) Date of Patent: Dec. 15, 2009

(54) UNIVERSAL PRINT MEDIA

(75) Inventors: Mridula Nair, Penfield, NY (US); Narasimharao Dontula, Rochester, NY (US); Michael R. Brickey, Webster, NY (US); Terry A. Heath, Caledonia, NY (US); Joseph W. Hoff, Fairport, NY (US); Tamara K. Jones, Rochester, NY (US); Daniel M. Leusch, Rochester, NY (US); Joseph S. Sedita, Albion, NY (US); Cumar Sreekumar, Penfield, NY (US); Dinesh Tyagi, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 698 days.

(21) Appl. No.: 11/197,240

(22) Filed: Aug. 4, 2005

(65) Prior Publication Data

US 2007/0031615 A1 Feb. 8, 2007

(51) Int. Cl.
*B32B 7/02* (2006.01)

(52) U.S. Cl. .................... 428/213; 428/195.1; 428/207; 428/331; 428/480; 428/500; 430/124.1; 430/126.1

(58) Field of Classification Search ................ 428/213, 428/195.1, 207, 331, 500, 480; 430/124, 430/126, 124.1, 126.1
See application file for complete search history.

(56) References Cited

U.S. PATENT DOCUMENTS

| | | | | |
|---|---|---|---|---|
| 5,658,677 | A | 8/1997 | Ebisch et al. | |
| 7,147,909 | B2 | 12/2006 | Nair et al. | |
| 7,211,363 | B2 | 5/2007 | Jones et al. | |
| 7,264,867 | B2 * | 9/2007 | Dontula et al. | 428/213 |
| 2002/0037176 | A1 | 3/2002 | Ogino et al. | |
| 2003/0186061 | A1 * | 10/2003 | Murata et al. | 428/421 |
| 2003/0219665 | A1 * | 11/2003 | Matsumura et al. | 430/108.1 |
| 2004/0166343 | A1 * | 8/2004 | Kung et al. | 428/480 |
| 2006/0115629 | A1 | 6/2006 | Nair et al. | |
| 2006/0115631 | A1 | 6/2006 | Nair et al. | |

* cited by examiner

*Primary Examiner*—Betelhem Shewareged
(74) *Attorney, Agent, or Firm*—Paul A. Leipold; Andrew J. Anderson

(57) ABSTRACT

The invention relates to a printing media comprising a first side comprising a first exposed layer comprising a mixture of polyolefin and at least one member selected from the group consisting of polyolefin copolymers, amide containing polymers, and ester containing polymers, wherein a measured $T_g$ of said exposed layer comprises a $T_g$ of less than 5° C. and a second side comprising an a second exposed layer having an advancing contact angle with water of less than 90°.

52 Claims, 4 Drawing Sheets

UNIVERSAL PRINT MEDIA

FIELD OF THE INVENTION

This invention relates to a novel print medium that is useful in augmenting the value of commercial print business and the commercially made or home made print. In a preferred form it relates to a printing medium comprising an image receiving exposed layer that provides near photographic quality print using any form of printing such as dry or liquid electrostatic printing, offset printing, flexographic printing, or gravure printing and has the ability to be glossed.

BACKGROUND OF THE INVENTION

Printing technologies are typically broadly classified as technologies that require an image carrier or a master (a printing plate), referred to as conventional or analog printing technologies, and the so called non-impact printing (NIP) technologies which do not require a printing plate, also know as digital printing. The major printing processes are also distinguished by the method of image transfer and by the general type of image carrier employed. Depending upon the process, the printed image is transferred to the substrate either directly or indirectly. In direct printing, the image is transferred directly from the image carrier to the substrate. Examples of direct printing are gravure, flexography, screen printing and letterpress printing processes. In indirect, or offset, printing, the image is first transferred from the image carrier to the blanket cylinder and then to the substrate.

All the conventional technologies use ink (colorant material) that is a liquid. Conventional printing includes screen printing, letterpress (including flexographic printing), lithography (offset, waterless offset) and gravure. NIP technologies include electrophotography (dry toner and liquid toner), ionography, magnetography (magnetic toner), inkjet (continuous uses liquid ink, drop on demand uses liquid or hot melt ink), thermography (sublimation, transfer) and silver halide photography. The printing inks or marking materials used for each of these printing technologies consists of colorants (pigments, dyes), vehicles (binders), additives and carrier substances (solvents). Depending on the printing process, inks have largely variable flow properties from extremely thin (less viscous, used in ink jet and gravure printing) through highly viscous (offset, letterpress) up to dry powder.

Marking technologies in common use in the printing world develop color by the deposition of the colorant material directly on the surface of the media. Therefore this is normally an extrinsic process of development of color and the required density for the print. This contrasts distinctly with the photographic process, in which the receiver or the specially sensitized media has built-in chemistry to develop the appropriate colors and densities from within, which are intrinsic to the media. A limitation of the extrinsic image formation process is that the image physicals are harder to control, because the colorant materials are exposed at the surface.

All of the above printing technologies can be classified as either analog or digital depending on the printing method as described earlier. Analog printing reproduces images with like images by employing analogous image transfer from a master image. Unlike analog printing technology that use stencils or plates containing full sized images, digital printing approaches assemble each image printed from a complex of numbers and mathematical formulas. They configure images from a matrix of dots or pixels and use digitally controlled deposition of ink, toner or exposure to electromagnetic energy, such as light, to reproduce images.

The structure and components of ink or colorant materials is determined by ink transfer mechanism and type of drying/fixing of the ink on the substrate/print medium. Since the technologies are so varied, typically printing media are tailored for each of the technologies. In all of the above printing methods high surface gloss is difficult to attain without an added foreign component in a second operation. Gloss is a measure of light reflectance from the surface. Usually, it is achieved by either lamination of the print with a sheet of plastic, or by coating over the print with either an aqueous or UV curable varnish. Gloss is sought because it provides printed products with a snappy overall attention-getting look, provides a greater depth of color and chromaticity and exhibits a higher gamut. For example, a glossy black appears to be blacker than a matte black and a glossy red darker and more intense than a matte red.

The production of near photographic quality images using commercial printing technologies such as, dry and liquid electrostatic printing and offset printing is highly desirable. It is even more desirable to produce such images on media that render the print with the look and feel of a typical photographic print produced with silver halide imaging technology, such as the degree and uniformity of glossiness, stiffness and opacity, and high resolution and sharpness with corresponding low grain appearance. While there are a variety of substrates available today for the different printing modalities, there is no one universal media that can give the same look and feel no matter what the printing method. With hybrid printing jobs that combine offset and digital jobs there is in need for media that can run on both types of machines and produce the same look and feel and a high degree of gloss.

When printing calendars, greeting cards and post cards, it is particularly desirable that the printed backside of the output can be marked with a writing instrument such as a ball point pen. U.S. Patent Application 2002/0037176 A1 discloses a receiver sheet provided with a special coating on the backside to enable writablilty. Similarly U.S. Pat. No. 5,658,677 discloses a one-sided image carrier where the backside is coated with silica rich coatings to impart writability. These constructions, while very useful, do not lend themselves to the manufacture of two-sided sheets where both sides can be imaged using different printing modalities and where one side can be selectively glossed.

PROBLEM TO BE SOLVED BY THE INVENTION

There is a need for a common media that can be printed by different print modalities and that has the ability to be glossed without the use of any foreign material during the process. There is also a need for such a media to have a backside that is writable.

SUMMARY OF THE INVENTION

It is an object of the invention to provide a common media that can generally be used with all digital and analog printing modalities.

It is another object to provide a common print media that can be printed using both digital and analog printing technologies to produce generally high surface gloss not withstanding the printing technology used.

It is a further object to provide a media for printing that can be post processed with heat and pressure to provide a predetermined surface pattern including high level of image gloss.

It is a still further object to provide a media for printing that can be glossed on one side and is writable on the other side.

These and other objects of the invention are accomplished by a printing media comprising a first side comprising a first exposed layer comprising a mixture of polyolefin and at least one member selected from the group consisting of polyolefin copolymers, amide containing polymers, and ester containing polymers, wherein a measured $T_g$ of said first exposed layer comprises a $T_g$ of less than 5° C. and a second side comprising a second exposed layer having an advancing contact angle with water of less than 90°.

In another embodiment of the invention there is provided a printing media comprising at least one side comprising a first exposed layer comprising a mixture of polyolefin and at least one member selected from the group consisting of polyolefin copolymers, amide containing polymers, and ester containing polymers, wherein a measured $T_g$ of said exposed layer comprises a $T_g$ of less than 5° C. wherein said exposed layer further comprises a poly(hydroxy acid) or a hydrophilic component selected from the group consisting of polymers derived from poly(vinyl alcohol) and poly(ethyloxazoline).

ADVANTAGEOUS EFFECT OF THE INVENTION

The invention provides media that can be printed using different print modalities and has the ability to be glossed. The invention includes media that is glossed on one side and writable on the backside and media with improved adhesion to the printing ink.

DETAILED DESCRIPTION OF THE INVENTION

Figure 1:
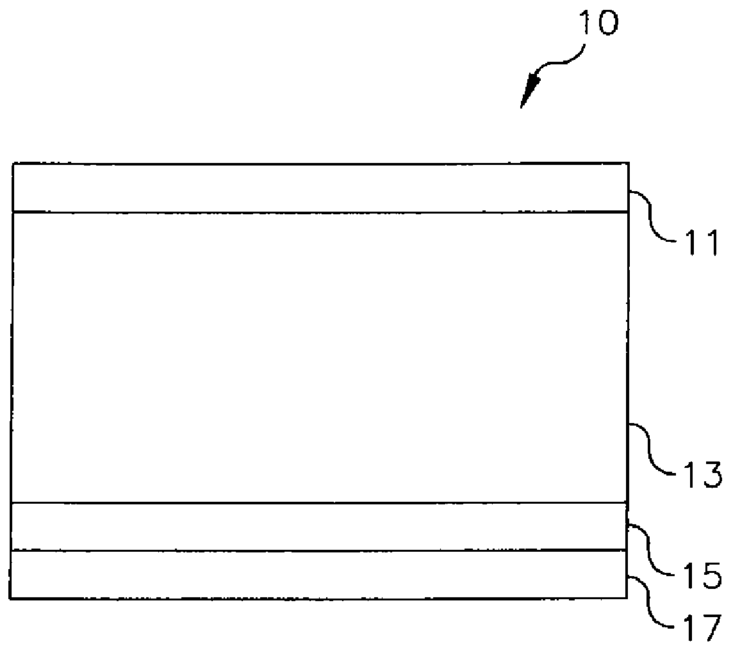
FIG. 1 is a schematic sectional view illustrating one embodiment of the printing media of the present invention.

The present invention has numerous advantages. The invention provides a specially developed image receiving surface layer which accepts the printing ink/colorant material from the appropriate printing process, and serves to embed it in the glossing step, providing for better image protection, better image properties such as saturation and better surface visual. The present invention also provides the commercial printer for the first time, with a choice of highly glossable substrates that is common between the various printing modalities available in the shop. Until the point of this invention, the printer has had to pick and choose the substrates depending on the printing technology used and the surface finish level desired for the output. This invention, therefore, allows for simplification of work processes and overall lowering of costs and possibly enhancing productivity. This invention discloses a printing medium that can be utilized in various printing processes. Although the preferred printing process is dry electrophotographic, the printing media of this invention was found to be suitable for other printing methods such as liquid electrophotographic, offset, flexographic, gravure and inkjet ink printing.

The invention provides a print media with control of surface texture and gloss without additional coatings or lamination. A unique advantage of the media of this invention is the provision to have a 'surface of choice' for the application, based on the same media choice. The media of this invention can, for example, provide a matte(texture) surface for printing, which can be used in a straightforward fashion as a printing surface; and the printed material can be directly used in specified applications (such as books or posters) as printed material on a matte surfaced paper. Alternatively, if a glossy surface is specified, the same material can be glossed in a post-printing step to yield highly glossed printed surfaces without additional coatings. During manufacture of the media, various surface finishes can be obtained which can be maintained during and after printing if desired or the texture can be removed and smoothed to an even gloss finish by passing the printed media through a glossing unit such as a belt fuser. Thus, the same stock can be used to provide more than one predetermined final surface finish suitable to the application, amounting to flexibility in a print shop environment, which can provide a variety of outputs using a limited set of media. Such versatility, an unprecedented and unobvious technical advance in the world of printed media, is a unique economic advantage offered by the subject of this invention.

The invention also provides print media that can provide near photo quality high gloss prints, where differential gloss and image relief, are minimized and adhesion to the colorant material applied during the printing process is maximized.

The media exhibits water resistance compared to present commercially available clay coated papers. The media further provides a backside that is writable before and after printing and serves to manage fuser oil contamination of the printer during duplex printing when using an electrophotographic printing process. The media also has an excellent degree of whiteness:

These and other advantages will be apparent from the detailed description below.

FIG. 1 is a schematic sectional view illustrating one embodiment of the printing media 10, of the present invention. The printing media 10, of the present invention comprises of a base 13, an exposed layer 11 which is comprised of a thermoplastic resin layer, another exposed layer 17 whose advancing contact angle with water is less than 90°, and at least an intermediate layer 15 which is comprised of thermoplastic resin.

Figure 2:
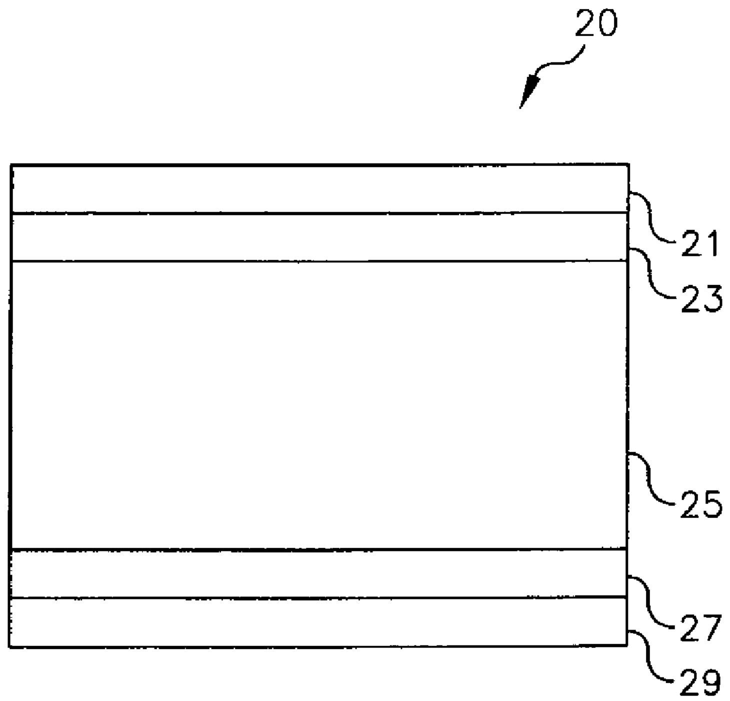
FIG. 2 is a schematic sectional view illustrating one embodiment of the printing media of the present invention.

FIG. 2 is a schematic sectional view illustrating another embodiment of the printing media 20, of the present invention. The printing media 20, of the present invention comprises a base 25, an exposed layer 21 which is comprised of a thermoplastic resin layer, another exposed layer 29 whose advancing contact angle with water is less than 90°, and at least one intermediate layer 23 and 27 on either side of the base 25, that are comprised of thermoplastic resin.

Figure 3:
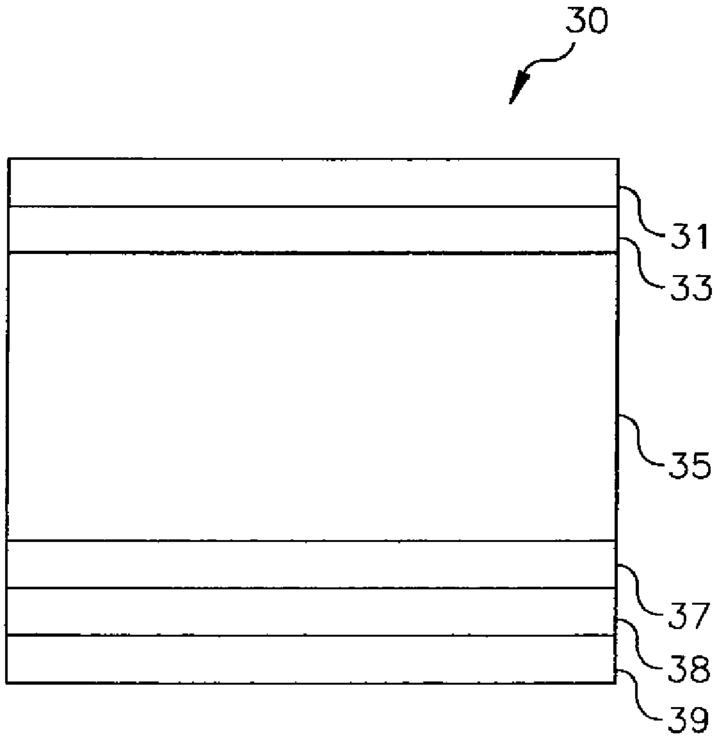
FIG. 3 is a schematic sectional view illustrating one embodiment of the printing media of the present invention.

FIG. 3 is a schematic sectional view illustrating another embodiment of the printing media 30, of the present invention. The printing media 30, of the present invention comprises of a base 35, an exposed layer 31 which is comprised of a thermoplastic resin layer, another exposed layer 39 whose advancing contact angle with water is less than 90°, and at least one intermediate layer 33 on one side of the base 35, and at least two intermediate layers 37, 38 on the other side of the base 35. The intermediate layers 37, 38, 39 are comprised of thermoplastic resin.

Figure 4:
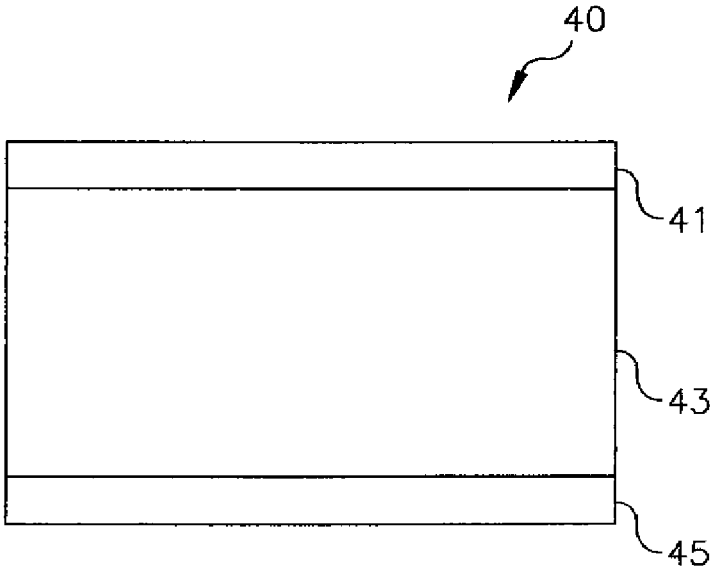
FIG. 4 is a schematic sectional view illustrating one embodiment of the printing media of the present invention.

FIG. 4 is a schematic sectional view illustrating another embodiment of the printing media 40, of the present invention. The printing media 40, of the present invention comprises of a base 43, an exposed layer 41 which is comprised of a thermoplastic resin layer, another exposed layer 45 whose advancing contact angle with water is less than 90°.

Figure 5:
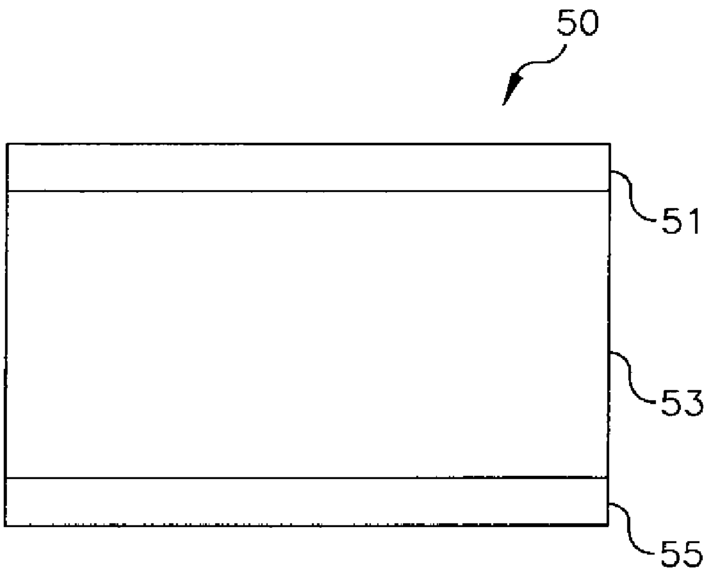
FIG. 5 is a schematic sectional view illustrating one embodiment of the printing media of the present invention.

FIG. 5 is a schematic sectional view illustrating another embodiment of the printing media 50, of the present invention. The printing media 5 50, of the present invention comprises of a base 53, and exposed layers 51 and 55 which are comprised of thermoplastic resin.

Figure 6:
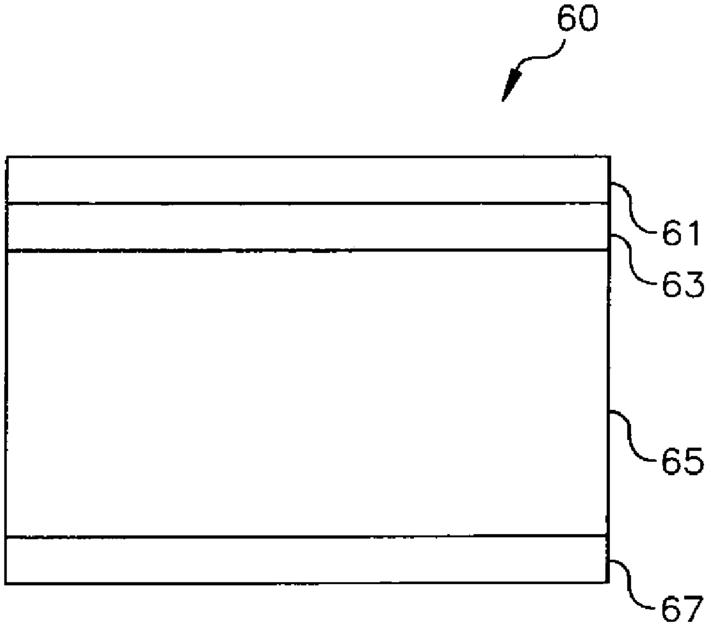
FIG. 6 is a schematic sectional view illustrating one embodiment of the printing media of the present invention.

FIG. 6 is a schematic sectional view illustrating another embodiment of the printing media 60, of the present invention. The printing media 60, of the present invention comprises of a base 65, an exposed layer 61 which is comprised of thermoplastic resin, another exposed layer 67 which is comprised of thermoplastic resin, and at least an intermediate layer 63 which is comprised of thermoplastic resin.

Figure 7:
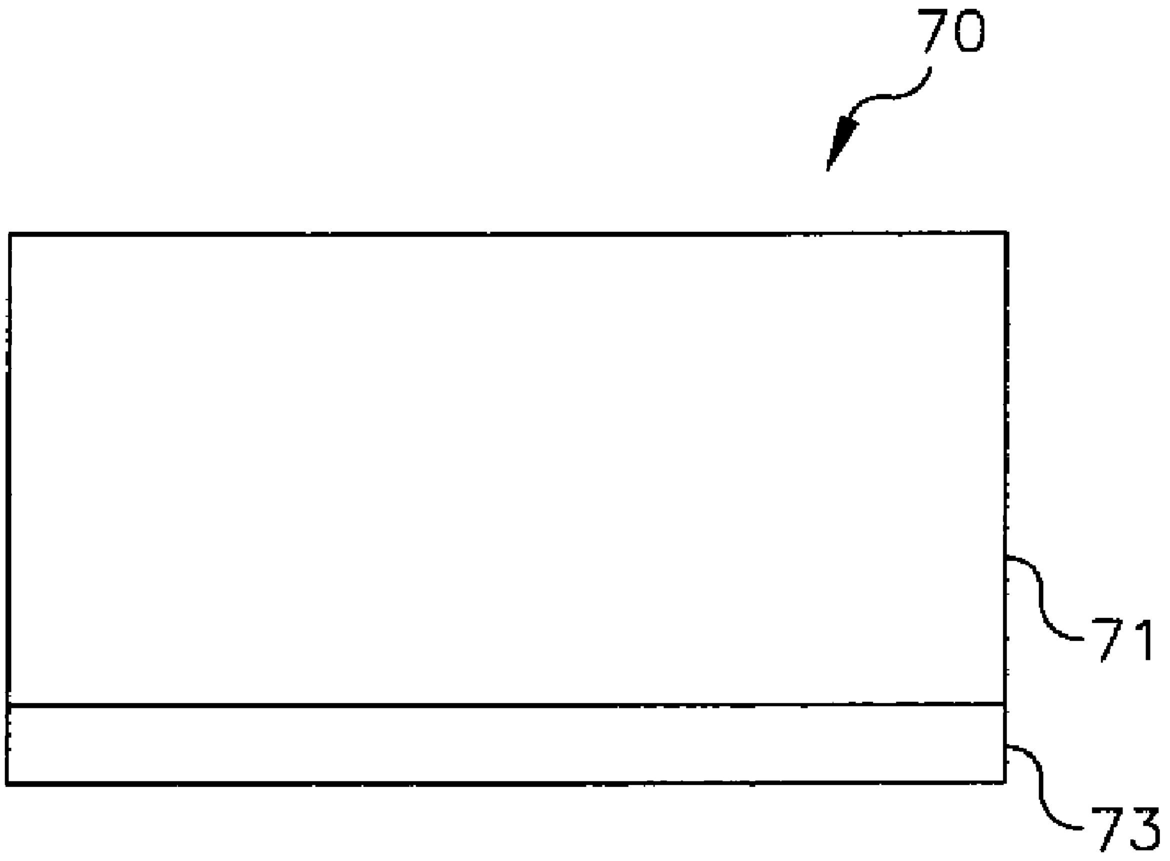
FIG. 7 is a schematic sectional view illustrating one embodiment of the printing media of the present invention.

FIG. 7 is a schematic sectional view illustrating another embodiment of the printing media 70, of the present invention. The printing media 70, is a structure that does not include a base and is comprised of a first side whose first exposed layer 71 is comprised of a thermoplastic resin layer, and a second side whose second exposed layer 73 has an advancing contact angle with water of less than 90°.

The invention utilizes material compositions for a print media. In one embodiment they are the coatings applied to a base. From here onwards, one of the sides resulting from the coating applied to the base or melt extruded without a base, is called first side; and the opposite side of the first side is called the second side. Furthermore from here onwards, the outermost layers on either side of the printing media are called the exposed layers. The invention further provides material compositions that can be applied as an extruded monolayer to the base. The invention further provides material compositions that can be applied as a coextruded layer to the base. The invention further provides material compositions that can be extrusion coated at high speeds. The invention further provides material compositions on exposed layers that are not tacky to touch and do not block. The invention further provides material compositions on exposed layers that retain silicone oil put on the surface at the fuser during electrophotographic printing. In another embodiment of the invention, the printing medium is a medium that does not include a base as in the other embodiments and is made up of material compositions such that surfaces are printable, are not tacky, and have the ability to be optionally writable on one side. This embodiment of the invention is depicted in FIG. 7. The following paragraphs describe in detail the various components of the printing media of the present invention.

The invention provides material compositions that in one embodiment may be utilized as coatings applied to a base that comprise a first side that comprise a first exposed layer comprising a mixture of polyolefin and an ester containing polymers, wherein a measured $T_g$ of said exposed layer comprises a $T_g$ of less than 5° C. The invention provides material compositions for the coatings applied to the base that comprise a first side that comprise a first exposed layer comprising an mixture of polyolefin and an amide containing polymer, wherein a measured $T_g$ of said at least one receiver layer comprises a $T_g$ of less than 5° C. The invention provides material compositions for the coatings applied to the base that comprise a first side that comprise an exposed layer comprising a hydroxy acid polymer. The invention, in one embodiment provides material compositions for the coatings applied to the base that comprise a first side that comprise an exposed layer comprising polymers selected from the group consisting of hydroxybutyric acid polymers, lactic acid polymers, derivatives and mixtures thereof. The invention provides material compositions for the coatings applied to the base that comprise a first side that comprise a first exposed layer comprising an hydrophilic component comprising polymers selected from the group consisting of polymers derived from poly(vinyl alcohol), poly(ethyloxazoline) and thermoplastic urethanes. The invention further provides material compositions for the coatings that comprises of a low molecular weight plasticizer component. The invention further provides a material composition that can be applied as an extruded monolayer to the base without the necessity of a primer layer or a tie layer. The invention further provides material compositions that can be applied as a coextruded layer. The invention further provides compositions that can be extrusion coated at high speeds. The invention further provides compositions that are not tacky to touch and do not block. The invention further provides exposed layer compositions that retain silicone fuser oil put on the surface at the fuser during electrophotographic printing.

Base

The term "base" as used herein refers to a substrate material that is the primary part of an element that is imaged such as paper, polyester, vinyl, synthetic paper, fabric, or other suitable material for the viewing of images. The bases for use in the present invention may be any base typically used in imaging applications. Typical base may be fabrics, paper, and polymer sheets. The base may either be transparent or opaque, reflective or non-reflective. The term as used herein, "transparent" means the ability to pass radiation without significant deviation or absorption. Opaque base include plain paper, coated paper, synthetic paper, low density foam core based substrate and low density foam core based paper. The base can also consist of microporous materials such as polyethylene polymer-containing material sold by PPG Industries, Inc., Pittsburgh, Pa. under the trade name of Teslin®, Tyvek® synthetic paper (DuPont Corp.), impregnated paper such as Duraform®, and OPPalyte® films (Mobil Chemical Co.) and other composite films listed in U.S. Pat. No. 5,244, 861. Transparent base include glass, cellulose derivatives, such as a cellulose ester, cellulose triacetate, cellulose diacetate, cellulose acetate propionate, cellulose acetate butyrate, polyesters, such as poly(ethylene terephthalate), poly(ethylene naphthalate), poly-1,4-cyclohexanedimethylene terephthalate, poly(butylene terephthalate), and copolymers thereof, polyimides, polyamides, polycarbonates, polystyrene, polyolefins, such as polyethylene or polypropylene, polysulfones, polyacrylates, polyether imides, and mixtures thereof. The papers listed above include a broad range of papers, from high end papers, such as photographic paper to low end papers, such as newsprint. The base used in the invention may have a thickness of from about 50 to about 500 micrometers, preferably from about 75 to 300 micrometers.

The base used in this invention could also be a paper raw base resin coated with polyolefin resin material known in the art. Suitable polymers for the polyolefin resin coating include polyethylene, polypropylene, polymethylpentene, polystyrene, polybutylene, and mixtures thereof. Polyolefin copolymers, including copolymers of polyethylene, propylene and ethylene such as hexene, butene, and octene are also useful. The polyolefin may also be copolymerized with one or more copolymers including polyesters, such as polyethylene terephthalate, polysulfones, polyurethanes, polyvinyls, polycarbonates, cellulose esters, such as cellulose acetate and cellulose propionate, and polyacrylates.

Polyethylene is preferred for resin coated paper base, as it is low in cost and has desirable coating properties. Preferred polyolefins are film forming and adhesive to paper. Usable polyethylenes may include high density polyethylene, low density polyethylene, linear low density polyethylene, and polyethylene blends. Polyethylene having a density in the range of from 0.90 g/cm$^3$ to 0.980 g/cm$^3$ is particularly preferred. The polyolefin resin, such as polypropylene, may be used when the support created is a laminated structure of paper and one or more biaxially or uniaxially oriented polypropylene films.

Typically, any suitable white pigment may be incorporated in the polyolefin resin layers of the resin coated raw base, such as, for example, zinc oxide, zinc sulfide, zirconium dioxide, white lead, lead sulfate, lead chloride, lead aluminate, lead phthalate, antimony trioxide, white bismuth, tin oxide, white manganese, white tungsten, and combinations thereof. The preferred pigment is titanium dioxide ($TiO_2$) because of its high refractive index, which gives excellent optical properties at a reasonable cost. The pigment is used in any form that is conveniently dispersed within the polyolefin. The preferred pigment is anatase titanium dioxide. The most preferred pigment is rutile titanium dioxide because it has the highest refractive index at the lowest cost. The average pigment diameter of the rutile $TiO_2$ is most preferably in the range of 0.1 to 0.26 micrometers. The pigments that are greater than 0.26 μm are too yellow for an imaging element application and the pigments that are less than 0.1 μm are not sufficiently opaque when dispersed in polymers. The size range is determined by the final optical characteristics i.e. colorimetry and opacity of the resin coated raw base. Preferably, the white pigment should be employed in the range of from about 7 to about 50 percent by weight, based on the total weight of the polyolefin coating. Below 7 percent $TiO_2$, the resin coated medium will not be sufficiently opaque and will have inferior optical properties. Above 50 percent $TiO_2$, the polymer blend is not manufacturable.

The surface of the $TiO_2$ utilized can be treated with an inorganic compounds such as aluminum hydroxide, alumina with a fluoride compound or fluoride ions, silica with a fluoride compound or fluoride ion, silicon hydroxide, silicon dioxide, boron oxide, boria-modified silica (as described in U.S. Pat. No. 4,781,761), phosphates, zinc oxide or, $ZrO_2$ and with organic treatments such as polyhydric alcohol, polyhydric amine, metal soap, alkyl titanate, polysiloxanes, or silanes. The organic and inorganic $TiO_2$ treatments can be used alone or in any combination. The amount of the surface treating agents is preferably in the range of 0.2 to 2.0% for the inorganic treatment and 0.1 to 1% for the organic treatment, relative to the weight of the titanium dioxide. At these levels of treatment, the $TiO_2$ disperses well in the polymer.

The polyolefin resins and $TiO_2$ and optional other additives utilized to create the base may be mixed with each other in the presence of a dispersing agent. Examples of dispersing agents are metal salts of higher fatty acids such as sodium palmitate, sodium stearate, calcium palmitate, sodium laurate, calcium stearate, aluminum stearate, magnesium stearate, zirconium octylate, or zinc stearate higher fatty acids, higher fatty amide, and higher fatty acids. The preferred dispersing agent is sodium stearate and the most preferred dispersing agent is zinc stearate. Both of these dispersing agents give superior whiteness to the resin coated layer.

In addition, it may be necessary to use various additives such as colorants, brightening agents, antistatic agents, plasticizers, antioxidants, slip agents, or lubricants, and light stabilizers in the resin coated supports as well as biocides in the paper elements. These additives are added to improve, among other things, the dispersibility of fillers and/or colorants, as well as the thermal and color stability during processing and the manufacturability and the longevity of the finished article. For example, the polyolefin coating may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra(2,4-tert-butylphenyl)-4,4'-diphenyl diphosphonite, octadecyl 3-(3',5'-di-tert-butyl-4'-hydroxyphenyl propionate), combinations of the above, and the like; heat stabilizers, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate; light stabilizers such as hindered amine light stabilizers (HALS), of which a preferred example is poly{[6-[(1,1,3,3-tetramethylbutylamino}-1,3,5-triazine-4-piperidinyl)-imino]-1,6-hexanediyl[{2,2,6,6-tetramethyl-4-piperdinyl)imino]}(Chimassorb 944 LD/FL).

The polyolefin resin coating utilized to create the base can include multilayer polyolefin structures, such as those achieved by multiple coatings, either sequential or via coextrusion. To minimize the number of resins required, a structure consisting of 1 to 3 layers on each side is preferred. In one embodiment of the present invention, at least one or all the layers can further comprise polyolefins. In a 3-layer structure, two of the three layers on each side may have substantially similar composition, preferably the two outside layers. The polyolefin resin of the outside layers may contain, optionally, pigments and other addenda.

The coating of a paper base material with the polyolefin preferably is by extrusion from a hot melt as is known in the art. The invention may be practiced within a wide range of extrusion temperatures, for example, from 150° C. to 350° C., and speeds, for example, from 60 m/min. to 460 m/min., depending on the particular intended application of the support. For many applications, preferred extrusion temperatures are from 300° C. to 330° C.

First Side

The printing media of this invention comprises a first side that has at least one resin layer. If it has more than one layer then the layers may be identical or so chosen to have good interlayer adhesion, as well as amenable to the various typical finishing operations like cutting, chopping, and perforating.

The resin layer used in his invention can be applied to the base by various extrusion operations like extrusion coating, lamination, hot melt extrusion or modification of cast extrusion or a coating operation. The resin layer amenable to these kinds of manufacturing operations and used in this invention could be a polyolefin resin material known in the art. Suitable polymers for the polyolefin resin coating include polyethylene, polypropylene, polymethylpentene, polystyrene, polybutylene, and mixtures thereof. Polyolefin copolymers, including copolymers of polyethylene, propylene and ethylene such as hexene, butene, and octene are also useful. The polyolefin may also be copolymerized with one or more copolymers including polyesters, such as polyethylene terephthalate, polysulfones, polyurethanes, polyvinyls, polycarbonates, cellulose esters, such as cellulose acetate and cellulose propionate, and polyacrylates.

Polyethylene is typically preferred, as it is low in cost and has desirable coating properties. Preferred polyolefins are film forming and adhesive to paper. Usable polyethylenes may include high density polyethylene, low density polyethylene, linear low density polyethylene, and polyethylene blends. Polyethylene having a density in the range of from 0.90 $g/cm^3$ to 0.980 $g/cm^3$ is particularly preferred. The polyolefin resin, such as polypropylene, may be used when the support created is a multilayer structure, or laminated structure of paper and one or more biaxially or uniaxially oriented polypropylene films.

The printing media of this invention should be able to be printed using various printing modalities and have the ability to be glossed. In order to accomplish this, the exposed layer on the first side that comes in contact with colorant material needs to have special material characteristics.

First Exposed Layer

In order to accomplish printing using various printing modalities and retaining the inherent ability to be glossed without the application of a coating or application of a laminate, material characteristics of the first exposed layer on first side need to be unique. The printing media of this invention comprises a first side comprising a first exposed layer comprising a mixture of polyolefin and at least one member selected from the group consisting of polyolefin copolymers, amide containing polymers, and ester containing polymers, wherein a measured $T_g$ of said exposed layer comprises a $T_g$ of less than 5° C. In one emodiment, the first exposed layer on first side of the printing media comprises a poly(hydroxy acid) such as, a lactic acid polymer or a hydroxy(butyric acid) polymer. This exposed layer on first side may contain a low molecular weight plasticizer component like an amide or ester wax. Furthermore, the materials chosen for the first exposed layer on the first side of the printing media of this invention is such that the exposed layer is hydrophobic before and after printing. A surface is defined as hydrophobic when it has an advancing contact angle with water of greater than 90 degrees. In another embodiment, the hydrophobic first exposed layer on the first side of the printing media comprises a hydrophilic component comprising a polymer selected from the group consisting of poly(vinyl alcohol) and poly(ethyloxazoline) and mixtures thereof. The choice of the various components in the exposed layer on the first side is made clear in the following paragraphs.

The printing media of the invention has an exposed layer designed to receive the image forming colorant material. Typically this exposed layer, when used in electrographic and electrophotographic applications is known as a toner receiver layer.

It is known that to fix the toner material to the toner receiver layer, the toner on the receiving sheet is subjected to heat and pressure, for example, by passing the sheet through the nip of fusing rolls. Both the toner polymer and the thermoplastic polymer of the toner receiver layer are softened or fused sufficiently to adhere together under the pressure of the fusing rolls. When both the toner receiver layer and the toner soften and fuse, the toner can be at least partially embedded in the thermoplastic toner receiver layer. For liquid toner or self-fixing toners, offset and other inks, residual carrier liquid of the colorant is removed from the paper by air-drying or heating. Upon evaporation of the solvent these colorant materials form a film bonded to the paper. For heat-fusible toners, thermoplastic polymers are used as part of the toner particle. Heating both removes residual liquid and fixes the toner to paper. The fusing step can be accomplished by the application of heat and pressure to the final image. Fusing can provide increased color saturation, improved toner adhesion to the receiver, and modification of the image surface texture. A fusing device can be a cylinder or belt. The fusing device can have an elastomeric coating which provides a conformable surface to enable improved heat transfer to the receiver. The fusing device can have a smooth or textured surface. The fusing step can be combined with the transfer step.

In forming toner images on conventional receiving sheets, the fusing and fixing of the toner to the sheet by the fusing rolls, creates gloss in the toned areas, i.e., in the so-called Dmax or black areas of the image. In the untoned areas, however, the so-called Dmin or white areas, also referred to as the non-imaged areas in this invention, no gloss is formed. In accordance with the present invention, however, when the toner or colorant-bearing printed media is subjected to heat and pressure in the fusing nip, the entire surface of the sheet develops a substantially uniform gloss. The resulting electrophotographic image has the look and feel of a silver halide photographic print. The 60° gloss in the Dmin or non-imaged areas, after glossing with a belt fuser is preferably 60 or greater.

The first exposed layer on the first side which acts as image or colorant receiver layer of printing media of this invention, comprises a thermoplastic polymer or thermoplastic blend of polymers or a component of the thermoplastic blend of polymers that has a glass transition temperature or $T_g$, or a melting point or $T_m$ that is close to that of the thermoplastic component of the colorant that is transferred to the first exposed layer. The $T_g$ of the imagereceiver layer or a component of the first exposed layer should be within 25° C. of the $T_g$ of the colorant binder and preferably is within 15° C. of the $T_g$ of the said binder. The $T_m$ of a component of the first exposed layer should be within 25° C. of the $T_g$ of the said binder and preferably is within 15° C. of the $T_g$ of the said binder. In the case of where only the resin component of the first exposed layer has a $T_g$ close to the $T_g$ of the toner, then, the rest of the polymer matrix of the first exposed layer should preferably have a significantly lower $T_g$ but is a semi-crystalline polymer. In such a case, the preferred polymer matrix of the first exposed layer on the first side suitable for receiving colorant materials such as electrophotographic toners is a polyolefin. Consequently, both the toner and the receiving layers often soften or melt when the toner is fixed to the receiving layer by heat and pressure. This contributes to the adhesion of the toner to the layer and to achieving of uniform gloss in both the Dmax and Dmin areas of the image resulting in minimum differential gloss.

Polmers in First Exposed Layer

U.S. Ser. Nos. 10/999,254 and 11/000,124, both filed Nov. 30, 2004, have disclosed certain material compositions that may be used for creating a toner receiver layer. This invention discloses new material compositions that can be utilized as a component for the first exposed layer on the first side so as to receive image colorant materials, including toners. Materials useable for the first exposed layer include a thermoplastic polymer or blends or mixtures of thermoplastic polymers which is capable of being deformed at the fixing temperature and also capable of receiving the colorants and providing uniform gloss after fusing. The blends may be miscible or immiscible blends. It is preferred that the $T_g$ of a resin component of the toner receiver layer be less than 5° C., more preferably less than −15° C., most preferably less than −30° C. It is also preferred that at least one resin component of the first exposed layer has a $T_g$ between 40° C. and 100° C. preferably between 40° C. and 85° C.; or a melting point ($T_m$) between 40° C. and 100° C. preferably between 40° C. and 85° C. More preferably, the $T_g$ of a resin component of the first exposed layer or the $T_m$ of a resin component of the first exposed layer is within 15° C. of the $T_g$ of the colorant binder or toner. When manufacturing a polymer blend there is a dispersed phase and a continuous phase. The continuous phase for this invention from here onwards is called the matrix polymer. In a preferred case, the continuous phase of the exposed layer is a polyester or polyolefin. More preferably the continuous phase is a polyolefin and most preferably the polyolefin is polyethylene. Amongst polyethylenes most preferred is low density polyethylene. The choice of the matrix resin is determined by the choice of the base, or the choice of the intermediate layers (the layers between exposed layer and the base) so as to get good adhesion. One preferred base is raw paper base. In order to obtain good adhesion to paper without use of a primer or a tie layer or an intermediate layer the preferred polymer adhering to the paper is a polyolefin, more preferably polyethylene. If polyethylene is the matrix polymer in the colorant material receiver layer, then it is well known that its $T_g$ is lower than 5° C. It is less than −10° C. (*Polymer Handbook*, J. Brandrup, E. H. Immergut, 3$^{rd}$ edition, page V/19). If polypropylene is the matrix polymer its $T_g$ is also lower than 5° C.

Polymer blends of this invention for the first exposed layer on the first side of the base are so designed that they are not tacky to touch and furthermore they do not block. Tack is defined as the energy required to separate two objects not permanently bound together (*Science*, vol. 285, pg 1219-1220). Blocking is defined within the scope of this invention as visible deterioration of the surfaces upon separation of two 24 square inch imaged elements placed in face-to-face contact under a 100 gram weight for 24 hours at 25° C. Material formulations for the exposed layer, created in this invention have low tack. If the exposed layer on the first side of the base have high tack, then it results in blocking of various layers of members on a master roll which is wound under tension, and also it results in blocking of various layers of members packed in a ream which results in difficulty in feeding of individual sheets. Furthermore, the first exposed layer of first side is hydrophobic. In order to optimize for absence of tack, hydrophobicity and good adhesion to the colorant materials, and good adhesion to intermediate layer or the base, the volume fractions of blend constituents in the first exposed layer of the first side are adjusted. Specifically for the case of immiscible polymer blends, the polymer blend compositions of the first exposed layer of the first side fulfill the following constraint $$\frac{\phi_1}{\phi_2} \geq \frac{\eta_1}{\eta_2}$$

where $\phi_1$ is the volume fraction of matrix polymer (continuous phase) and $\phi_2$ is the volume fraction of the dispersed phase (thermoplastic polymer resin which are blended into the matrix). $\eta_1$ and $\eta_2$ are the melt viscosities of the matrix polymer and the dispersed phase respectively in the above equation. As is well know in polymer blend literature, compatibilizers may be added to control the size of the dispersed phase as well as to further enhance the polymer blend properties. The choice of the compatibilizers will depend on choice of the dispersed phase. Some preferred compatibilizers are modified or functionalized polyolefins. Some preferred compositions of the invention that satisfy the constraint on volume fraction ratio as described by the above equation are that the weight percent of the dispersed phase should be between 3%-50%, more preferably 5%-30%.

For the dispersed phase in the first exposed layer of the first side, the thermoplastic polymers for use with the invention are aliphatic polyesters, particularly those derived from hydroxy acids such as lactic acid polymers, polymers derived from the group consisting of hydrophilic polymers such as poly(vinyl alcohol), and poly(ethyloxazoline), thermoplastic poly urethanes, their derivatives and mixtures thereof. Poly (hydroxy acids) or hydroxyalkanoate polymers (PHA) are represented by the generic structure shown below. When, R in the structure is a methyl group and x=0 the PHA polymer is polylactic acid and when x=1, then the PHA polymer is a poly-(3-hydroxybutyric acid).

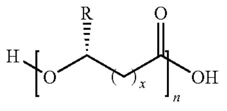

PHAs in general, are semicrystalline thermoplastics whose characteristics can be altered to produce various homopolymers, copolymers and terpolymers. Using this, the $T_g$ and $T_m$ of the PHA polymers can be varied and the preferred $T_g$ and $T_m$ of these polymers for this invention have been detailed above. These polymers may be commercially obtained from companies like Metabolix and Mitsui Chemicals. The weight fraction used of PHA used in this invention is 5% to 50% preferably 10%-30%.

A particularly preferred PHA for use in this invention is poly(lactic acid). Lactic acid polymers and all the isomers are generally referred to in the art as “PLA”. Therefore, the terms “poly(lactic acid)”, “polylactide”, and “PLA” are used interchangeably in this application to include homopolymers or copolymers of lactic acid or lactide based on polymer characterization of the polymers being formed from a specific monomer or the polymers being comprised of the smallest repeating monomer units. These terms, however, are not meant to be limiting with respect to the manner in which the polymer is formed. The PLA used in this invention includes single D- or L-isomers, or mixtures thereof. Thus, the PLA includes poly(D-lactic acid), poly(L-lactic acid), and mixtures thereof. These are more fully described in Poly(lactide): a Natural “Green” Alternative for Plastic Packaging Materials, Rafael Auras et al., MSU School of Packaging, East Lansing Mich. 48824-1223, USA. Generally, the poly(lactic acids) have a glass transition temperature ($T_g$) of from about 55° C. to about 65° C. The weight fraction of lactic acid polymers specifically poly(lactic acids) used is 5 weight % to 50 weight % more preferably 10 weight % to 30 weight %.

Suitable poly(lactic acid)s can be prepared by polymerization of lactic acid or lactide and comprise at least 50% by weight of lactic acid residue repeating units, lactide residue repeating units, or combinations thereof. These lactic acid and lactide polymers include homopolymers and copolymers such as random and/or block copolymers of lactic acid and/or lactide. The lactic acid residue repeating monomer units may be obtained from L-lactic acid, D-lactic acid, or D,L-lactic acid, preferably with L-lactic acid isomer levels up to 75% to provide poly(L-lactic acid). Examples of commercially available poly(lactic acid) polymers include a variety of poly (lactic acid)s that are available from Chronopol Inc. (Golden, Colo.), or polylactides sold under the trade name EcoPLA®. Further examples of suitable commercially available poly (lactic acid) are Natureworks® from Cargill Dow, Lacea® from Mitsui Chemical, or L5000 from Biomer. Poly(lactic acid), is available in amorphous as well as semi-crystalline form.

Poly(lactic acids) may be synthesized by conventionally known methods. They may be synthesized by a direct dehydration condensation of lactic acid, or ring-opening polymerization of a cyclic dimmer (lactide) of lactic acid in the presence of a catalyst. However, poly(lactic acid) preparation is not limited to these processes. Copolymerization may also be carried out in the above processes by addition of a small amount of glycerol and other polyhydric alcohols, butanetetracarboxylic acid and other aliphatic polybasic acids, or polysaccharide and other polyhydric alcohols. Further, molecular weight of poly(lactic acid) may be increased by addition of a chain extender such as diisocyanate.

Poly(vinyl alcohols) that may be used according to the invention are all poly(vinyl alcohols) which are extrudable or which are made extrudable by the addition of appropriate additives such as plasticizers. Some of the commercially available poly(vinyl alcohol) grades may contain inorganic additives like calcium carbonate, talc etc. added to it. The poly(vinyl alcohol) and copolymers thereof, employed in a preferred embodiment of the invention, has a degree of hydrolysis of at least about 50%, preferably at least about 75% and preferably less than 90 percent. Commercial embodiments of such poly(vinyl alcohol) are P2 grade of polymers from PVAXX group; AQUASOL polymers from A. Schulman, C-10, C-25 and W-40 grades from Adept Polymers Limited and copolymers include EXCEVAL grade of polymers EVOH-co-PVOH from Kuraray Chemical. Preferred poly(vinyl alcohols) are cold-water soluble grades. The weight fraction of poly(vinyl alcohols) used is 5 weight % to 50 weight % preferably 10 weight % to 30 weight %. The final amount is so chosen to satisfy the equation of immiscible blends or such that the exposed layer remains hydrophobic.

In another embodiment of the invention the hydrophilic thermoplastic polymer is a poly(alkyloxazoline), such as poly (2-ethyl-2-oxazoline) (PEOX). Commercial embodiments of poly(ethyloxazoline) polymer is AQUAZOL available from International Specialty Products and Polymer Chemistry Innovations. The $T_g$ of poly(2-ethyl-2-oxazoline) is 46° C. to 55° C. Poly(2-ethyl-2-oxazoline) is typically obtained commercially is the molecular weight range of 5000 to 500,000, with a polydispersity (molecular weight distribution) of 3-4. Preferred polymer molecular weight for this application is 50,000 to 200,000. The weight fraction of poly(2-ethyl-2-oxazoline) used is 5 weight % to 50 weight %, preferably 10 weight % to 30 weight %. The final amount is so chosen to satisfy the equation of immiscible blends or such that the first exposed layer remains hydrophobic.

In one embodiment of the invention the hydrophilic thermoplastic polymer is a aliphatic thermoplastic polyurethane like the TECOPHILIC grades available from Noveon. The weight fraction of the thermoplastic urethane used is 5 weight % to 50 weight %, preferably 10 weight % to 30 weight %. The final amount is so chosen to satisfy the equation of immiscible blends or such that the first exposed layer remains hydrophobic.

Besides polyolefin, the first exposed layer of the first side of the printing media of this invention contains at least one member selected from the group consisting of polyolefin copolymers, amide containing polymers, and ester containing polymers. The weight fraction of these polymers used is between 0 wt %-50 weight %, preferably between 5 weight %-30 weight %.

For example, the copolymers of polyethylene of interest for this invention are ethylene methyl acrylate copolymers (EMA); copolymer of ethylene, and glycidyl methacrylate ester (EGMA); terpolymer of ethylene, methyl acrylate and glycidyl methacrylate ester (EMAGMA); terpolymer of ethylene butylacrylate and maleic anhydride (EBAMAH) ethylene vinyl acetate copolymers (EVA); ethylene methacrylic acid copolymers (EMAA); ethylene acrylic acid copolymers (EAA). Preferred copolymer of polyethylene for use in this invention is EMA. Furthermore, amide containing polymers can be polyamides that can belong to the family of nylon-6, nylon-11, nylon-12, nylon-66, nylon-610, MXD6 etc. The preferred amide containing polymer is nylon-6.

Other polymers that may be incorporated in the first exposed layer are polyester resins, polyurethane resins, polyurea resin, polysulfone resin, polyvinyl chloride resin, polyvinylidene chloride resin, vinyl chloride/vinyl acetate copolymer resin, vinyl chloride/vinyl propionate copolymer resin, polyol resins such as polyvinyl butyral; and cellulose resins such as ethyl cellulose resin and cellulose acetate resin, polycaprolactone resin, styrene/maleic anhydride resin, polyacrylonitrile resin, polyether resins, epoxy resins and phenolic resins, polyolefin resins such as polyethylene resin and polypropylene resin; polystyrene resins, styrene/butylacrylate copolymers, and mixtures thereof. The thermoplastic resins are preferably polyesters, acrylics, styrenics, styrene copolymer such as, styrene/acrylic acid ester copolymers, styrene/methacrylic acid ester copolymers, and mixtures thereof.

In many cases, since the above-mentioned resins and copolymers are typically used for forming the toner used in electrophotographic applications, the thermoplastic resin polymer included in the first exposed layer may belong to the same group as that of these resins and copolymers.

In this invention, thickness of first exposed layer is 5 to 50 micrometers, preferrably, 10 to 30 micrometers. The exposed layer on first side of the base preferably has an average surface roughness, Ra, of between 0.5 to 10 micrometers prior to printing and 0.3-5 micrometers after printing but prior to glossing. Ra is surface roughness expressed as the arithmetic average height calculated over the entire measured array. The surface roughness described here is achieved during the manufacturing of the media through melt extrusion coating of the resin and subsequent contact of the resin to a textured chill roll to obtain the desired surface pattern. A matte surface prior to printing typically has an Ra of 1-3 micrometers. When a high degree of gloss is required for the imaged first exposed layer, the surface is subjected to a glossing operation in a second step using a belt fuser or calendaring apparatus. The measurement of gloss is based on the varying scattering angles of light in accordance with surface structure. Goniometers can provide great detail on light reflectance but typically glossmeters are used and they measure light reflected in a few selected directions.

Glossing of the printed media of this invention for a high gloss level (defined here as 60 degree Gardner gloss greater than 60 for the Dmin or non-image bearing areas) results in a preferable final average surface roughness of between 0.05 micrometers and 0.3 micrometers. The print media may also be glossed to different degrees based on conditions in the glosser, glosser belt features as well as requirements of the customer.

In a preferred embodiment, a belt fusing apparatus as described in U.S. Pat. No. 5,895,153 can be used to provide high gloss finish to the printed media of this invention. The belt fuser can be separate from or integral with the reproduction apparatus. In a preferred embodiment of the present invention, the belt fuser is a secondary step. The toned image is at first fixed either by passing the electrophotographically printed sheet through the nip of fusing rolls within the reproduction apparatus or in the case off offset printing by drying the inked image, and then subjected to belt fusing to obtain a high uniform glossy finish. The belt fusing apparatus includes an input transport for delivering marking particle image-bearing receiver members to a fusing assembly. The fusing assembly comprises a fusing belt entrained about a heated fusing roller and a steering roller, for movement in a predetermined direction about a closed loop path. The fusing belt is, for example, a thin metallic or heat resistant plastic belt. Metal belts can be electroformed nickel, stainless steel, aluminum, copper or other such metals, with the belt thickness being about 50.8 to 127 micrometers. Seamless plastic belts can be formed of materials such as polyimide, polypropylene, or the like, with the belt thickness summarily being about 50.8 to 127 micrometers. Usually these fusing belts are coated with thin hard coatings of release material such as silicone resins, fluoropolymers, or the like. The coatings are typically thin (1 to 10 micrometers), very smooth, and shiny. Such fusing belts could also be made with some textured surface to produce images of lower gloss or texture.

The belt fuser can have a pressure roller located in nip relation with the heated fusing roller. A flow of air is directed at an area of the belt run upstream of the steering roller and adjacent to the steering roller to cool such area. The cooling action provides for a commensurate cooling of a receiver member, bearing a marking particle image, while such member is in contact with the fusing belt. The cooling action for the receiver member serves as the mechanism to substantially prevent offset of the marking particle image to the pressure roller.

The belt fusing apparatus can be mounted in operative association with a belt tracking control mechanism.

High gloss finish or glossing can also be provided to the printed media of this invention by using calendering methods known in the art. Calendering is defined herein as a process in which pressure is applied to the imaged substrate, that has been preferably roller fused in the printing apparatus, by passing it between highly polished, metal rollers that are optionally heated, imparting a glossy, smooth surface finish to the substrate. The degree of pressure and heat controls the extent of gloss. Calendering differs from roller fusing in that the latter does not necessarily use highly polished rollers, is always carried out at high temperatures and the nip pressures are lower than those experienced at the calendering nip.

Additives in First Exposed Layer

In order to make the first exposed layer on first side multifunctional, it may contain many kinds of additives. The first exposed layer on the first side may contain white pigments, fuser oil sorbing additives, colorants, dispersing agents, antioxidants, UV stabilizers, and slip agents. The white pigments that may be used are for example, zinc oxide, zinc sulfide, zirconium dioxide, white lead, lead sulfate, lead chloride, lead aluminate, lead phthalate, antimony trioxide, white bismuth, tin oxide, white manganese, white tungsten, and combinations thereof. The preferred pigment is titanium dioxide ($TiO_2$) because of its high refractive index, which gives excellent optical properties at a reasonable cost. The pigment is used in any form that is conveniently dispersed within the polyolefin. The preferred pigment is anatase titanium dioxide. The most preferred pigment is rutile titanium dioxide because it has the highest refractive index at the lowest cost. The desired characteristics of such a pigment is the same as those desired for incorporation in the base as described earlier.

In a preferred embodiment, the universal printing medium is used in dry electrophotographic printing where silicone oil is sometimes applied at the fuser nip (e.g. in NexPress 2100), to aid the release of the toner from the fuser roller. The first exposed layer in such a medium, needs to incorporate fuser oil sorbent additives that include adsorbents and absorbents, and they may be any suitable material. They have specific physical and chemical properties that allow them to capture and retain the excess fuser-oil.

Sorbent (adsorbent and/or absorbent) additives may be organic or inorganic and may be synthetic. Typical of such materials are clay, talc, glass wool, silica, peat moss, synthetic fibers such as nylon, plastic adsorbent microspheres and the like. The preferred material are clay, talc and silica since they are readily available in a manner that can be easily formulated into coating dispersions for the toner receiving layer, can be obtained at a high brightness index and are inexpensive. The oil sorbent additives are present in an amount greater than 0.1 weight percent of the exposed layer on the first side of the base and preferably from 2 to 15 weight percent of the layer.

When the inorganic additive in the first exposed layer is silica, it can also serve to improve the adhesion on the colorant image to the first exposed layer based on the particle size and coverage and fuser-oil retention. In order to acheive these characteristics, appropriate size range of silica needs to be selected or the first exposed layer coverage needs to be tailored such that the silica particles protrude out of the thermoplastic surface. Silicas of use for this application can be diatomaceous earth which is available from nature, or the preferred silicas are synthetic silicas like those obtained from INEOS under the brand name Gasil, or obtained from ISP under the brand name Silcron. The preferred median particle of synthetic silicas is less than 15 micrometers, and it has a high pore volume, such that oil absorption characteristics as evaluated by linseed oil absorption, is preferably between 60 gm-300 gm for 100 gms of the silica.

The clays usable herein preferably have a GE brightness index greater than 88% and include various modified and unmodified clays including nanoclays. Brightness is the percent of blue light reflected of a sample measured at an effective wavelength of 457 nm. GE brightness is a directional brightness measurement utilizing essentially parallel beams of light to illuminate the paper surface at an angle of 45 degrees.

The clay materials suitable for the first exposed layer of this invention include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite (kaolin or china clay), and mixtures thereof. The aforementioned clay can be natural or synthetic, for example, synthetic smectite clay. For this invention, the clay particles in the dispersed form should have a particle size where greater then 90% of the particles are less than or equal to 2 micrometers.

The clay, if used, in the first exposed layer of this invention can be an organoclay. Organoclays are produced by interacting the unfunctionalized clay with suitable intercalants. These intercalants are typically organic compounds, which are neutral or ionic. Useful neutral organic molecules include polar molecules such as amides, esters, lactams, nitriles, ureas, carbonates, phosphates, phosphonates, sulfates, sulfonates, nitro compounds, and the like. The neutral organic intercalants can be monomeric, oligomeric or polymeric. Neutral organic molecules can cause intercalation in the layers of the clay through hydrogen bonding, without completely replacing the original charge balancing ions. Useful ionic compounds are cationic surfactants including onium species such as ammonium (primary, secondary, tertiary, and quaternary), phosphonium, or sulfonium derivatives of aliphatic, aromatic or arylaliphatic amines, phosphines and sulfides. Typically onium ions can cause intercalation in the layers through ion exchange with the metal cations of the preferred smectite clay. A number of commercial organoclays for example Cloisite 15A, a natural montmorillonite modified with a quaternary ammonium salt, are available from clay vendors, such as Southern Clay Products and Nanocor, which may be used in the practice of this invention.

Talcs, hydrated magnesium silicate is a mineral that is hydrophobic or oleophilic. The talcs useful in the exposed layer on the first side of the base of this invention have a median size greater than 0.2 micrometers. The preferred sized range of talc is such that the median size is greater than 0.5 micrometers and less than 3 micrometers. The particle size distribution of the talcs is preferably narrow. Commercially talcs can be obtained from Luzenac, Imi Fabi, and Specialty Minerals Inc.

Intermediate Layers of First Exposed Side

The exposed layer on the first side of the base might be directly applied to the base as shown in FIGS. 1, 4 and 5, or might lie on an intermediate layer/s as schematically depicted in FIGS. 2, 3 and 6.

The first exposed layer might be created by any of the extrusion processes (modified cast extrusion, extrusion coating, hot melt extrusion), preferably an extrusion coating process. If multilayer structures exist on the first side then it can be created by sequential multiple coating operations or it can be created via coextrusion. If a multilayer structure exists, then intermediate layers can have various functions. It can exist solely like a "filler" layer in order to maintain caliper (thickness) of the printing media and to reduce the cost of the overall print media if it is made up of lower cost materials. Furthermore, the intermediate layers might exist so as to reduce the number of functional requirements of the exposed layer on the first side of the base e.g. the intermediate layers could contain the opacifiers and colorants. Typically, intermediate layers and the choice of the resins used for intermediate layers are selected based on requirements of customer and finishing criteria. Preferred resin in the intermediate layers is a polyolefin resin. Preferred number of intermediate layers is 1-2. The ratio of thickness of the sum total of intermediate layers on the first side of the base to the exposed layer on the first side of the base is in the range of 0.5 to 8 with 3 to 7 being the most preferable. In this invention, thickness of the first exposed layer on first side of the base is 5 to 50 micrometers, preferred is 10 to 30 micrometers.

Extrusion coating operations typically are carried out at 150° C. to 350° C., and speeds, for example, from 60 m/min. to 460 m/min., depending on the polymers/resins being extrusion coated. Conventional melt extrusion coating techniques may be used in accordance with this invention. In such processes, a polymer/resin is first subjected to heat and pressure inside the barrel of an extruder. The molten polymer is then forced through the narrow slit of an extrusion-coating die by an extruder screw. At the exit of the die slit, a molten curtain emerges. This molten curtain is drawn down from the die into a nip between two counter-rotating rolls, a chill roll, and pressure roll. While coming into contact with the faster moving substrate in the nip formed between the chill roll and the pressure roller, a hot film is drawn out to the desired thickness on the substrate.

In order to achieve the desired surface roughness for the print media, it is advantageous to use an appropriate cooling roller or chill roll in the extrusion process as mentioned earlier. Chill rolls containing different textures (such as matte) are available and used. Thus, the coated substrate can be passed between a chill roll and pressure roll that presses the coating onto the substrate to ensure complete contact and adhesion. After the extrusion process, the exposed layer on first side of the base preferably has an average surface roughness of between 0.5 to 10 micrometers.

The combination of the extruder screw speed which determines output for a given die geometry and resin rheology and web line speed determines the thickness of the layer. In one form of a co-extrusion system, different types of molten polymers from two or more extruders combine in a co-extrusion feed block to form a multi-layered structure. This multilayered "sandwich" is then introduced into the die and will flow across the full width of the die. With co-extrusion, a multi-layered coating can be produced in a single pass of the substrate.

Second Exposed Layer on Second Side

This invention discloses two families of exposed layer on second side of the base. The first family of second exposed layers on second side is a hydrophobic layer which comprises of thermoplastic resin. The second family of second exposed layer on second side is a writable layer and has a contact angle with water of less than 90° and the following paragraphs provide detail on the two families of the second exposed layer on the second.

In a specific embodiment, where writability on the first side is not required or where it is desirable to achieve a high gloss on both the sides of the print media, then the second exposed layer on the second side can be hydrophobic. More desirably the second exposed layer on the second side can have compositions that can be similar to exposed layer on first side of the base or might be dissimilar. For the case where the second exposed layer on the second side has a different composition than first exposed layer on first side then the thermoplastic resin of choice is polyolefin, preferably polyethylene, more preferably a blend of high density polyethylene and low density polyethylene. For all other cases, preferably the second exposed layer comprises of a mixture of polyolefin and at least one member selected from the group consisting of polyolefin copolymers, amide containing polymers, and ester containing polymers, wherein a measured $T_g$ of said exposed layer comprises a $T_g$ of less than 5° C. wherein said exposed layer further comprises a poly(hydroxy acid) or a hydrophilic component selected from the group consisting of poly(vinyl alcohol) and poly(ethyloxazoline), their derivatives and mixtures therof. The limitations on the choice of polymers used in this composition are similar to those used in the exposed layer on the first side of the base. The exposed layer on second side of the base can contain inorganic additives like calcium carbonate, barium sulfate, talc, $TiO_2$ etc. The exposed layer on second side of the base may also contain colorants, brightening agents, antistatic agents, plasticizers, antioxidants, slip agents, or lubricants, and light stabilizers. The choice of the additives and polymers are made dependent on their capability to be extruded and would belong to the family of additives chosen to formulate exposed layer on first side of the base. The preferred extrusion process for this exposed layer on second side of the base is extrusion coating. In this invention, thickness of exposed layer on second side of the base is 5 to 50 micrometers, preferably, 10 to 30 micrometers. The exposed layer on first side of the base has an average surface roughness of between 0.5 to 10 micrometers prior to printing. FIGS. 5 and 6 depict schematically the cases where the exposed layer on the second side of the base (item 55, and item 67) is hydrophobic.

Where writability on the backside is desired, the exposed layer on the backside may be constructed as shown in FIGS. 1, 2 and 3 such that the second exposed layer has an advancing contact angle with water of less than 90°. Onto the bare backside of paper or onto those with a coating as in the second exposed layer described above, may be coated a layer containing inorganic particles as shown in FIG. 3 and FIGS. 1 and 2 respectively. These inorganic particles may be chosen from inorganic particles such as silica, alumina, titania, clay and calcium carbonate or mixtures thereof. Of these silica and clay are most preferred. The silica is preferred to be a hydrophilic fumed silica preferably with an average primary particle size of less than 500 nm, more preferably between 5-50 nm. Commercially available dispersions such as AEROSIL 200 with an average primary particle size of 12 nm and a specific surface area of 200 $m^2/g$, supplied by Aerosil and Ludox AM with a particle size of 12 nm, supplied by DuPont can be used as the sources of silica for the second exposed layer.

The binder for the second exposed layer of the printing medium can be any thermoplastic binder such as a film-forming polymer, provided it has good adhesion to the underlying thermoplastic layer or to the bare paper. The binder polymer can be one or more of a water soluble polymer, a hydrophilic colloid or a water insoluble polymer, latex or dispersion. Particular preference is given to polymers selected from the group of polymers and interpolymers prepared from ethylenically unsaturated monomers such as styrene, styrene derivatives, acrylic acid or methacrylic acid and their derivatives, olefins, (meth)acrylonitriles, itaconic acid and its derivatives, maleic acid and its derivatives, vinyl halides, vinylidene halides, and others. Also included are aqueous dispersions of condensation polymers such as polyurethanes and polyesters and hydrophilic colloids such as derivatives of cellulose. The total dry weight % of silica in the marking enhancement layer of the toner receiver layer can vary from 50 to 99, but preferably between 70 to 98. The dry coverage of the marking enhancement layer of the present invention generally is less than 10 $g/m^2$, but preferably from 0.01-5 $g/m^2$.

In addition to the silica, preferably a hydrophilic fumed silica and a polymeric film-forming binder with good adhesion to the underlying layer, the coating composition of the present invention may include other ingredients (vide U.S. Pat. No. 5,405,907, for example), colorants, crosslinking agents, surfactants and coating aids, defoamers, thickeners, coalescing aids, matte particles, lubricants, pH adjusting agents and other ingredients known in the art. Of these the preferred additive to enhance writability are the matte particles. These particles have an average diameter between 5 and 20 micrometers, preferably between 5 and 15 micrometers.

The second exposed layer has an advancing contact angle with water of less than 90° and is highly porous as evidenced by the wetability of the layer. Contact angle is a function of the liquid's surface tension and the surface "free" energy at the substrate/medium. Contact angles can be measured in many different ways. Placing a liquid droplet on a specimen surface causes it to form a contact angle at the interface between the liquid and the substrate. By definition, a droplet which "beads up," is non-wetting and a contact angle higher than 90 degrees is displayed. When the droplet "wets out" across the surface, wetting is obtained and the contact angle is less than 90 degrees. Contact angle measurement is a reliable method to characterize the interaction between a liquid and a surface. When the liquid droplet does not penetrate into the substrate (e.g. water on glass) the interaction can be characterized by the static contact angle if the surface is smooth and homogeneous. When the liquid penetrates into or spreads across the specimen surface the interaction can be characterized by the dynamic contact angle as a function of time. The wetting hysteresis of a surface is characterized by the advancing and receding contact angles describing the wetting and de-wetting properties at a surface respectively. Advancing contact angle is the contact angle that is most commonly measured. The advancing angle refers to a wetting process, where liquid is changing, or has changed, a dry solid surface into a wet one. More particularly, this means a solid-vapor surface has changed to a solid-liquid surface. In the rare case of liquid-liquid contact angles, this would be a liquid-vapor surface changing to a liquid-liquid surface. The word "advancing" comes from the requirement that the drop be just ready to spread further on the substrate surface. That is, if we added any more liquid to the drop, it would spread further. Thus the advancing contact angle is the largest possible angle with the drop still at steady state.

It is desirable that the advancing contact angle of the second exposed surface with water be less than 90 degrees in order to enable writability with a ball point pen. Also, it is desirable that the second exposed layer has a high surface area or porosity such as is created by coating a highly filled layer as described by this invention. Such a backside is additionally expected to ensure that during dry electrographic printing, the silicon fuser oil will not only penetrate the backside at the fuser but will retain the oil at the same time during duplex printing at the intermediate substrate due to the higher energy required for a highly nonpolar oil to traverse out of a hydrophilic inorganic coating of the second exposed side.

Duplex printing involves printing forming images on both sides of a sheet, in which, when the duplex mode is selected, the image transferred onto the front face of the sheet, is fixed by fusing as described earlier and after the sheet is reversed by means of a sheet reversing conveying mechanism, the sheet is reconveyed for printing on the backside and the image transferred onto the backside is fixed again by fusing.

The fusing device provides a pair of heated rollers (a fuser roll and a pressure roll) that rotate in contact with each other creating a nip, and the image receiver sheet carrying the transferred image on it, passes through a nip area between the fusing rollers to fix the unfused toner image onto the sheet. An oil coating applicator applies silicone oil as a lubricant onto the surface of the fuser roll in order to prevent the offset of the toner from the receiver sheet on to the fuser roll. The oil, although it is applied only to the fuser roller, transfers to the surface of the pressure roll since the two rolls are in contact in the absence of the receiver sheet. Accordingly, during printing, when fixing the image on the face side of the receiver, fuser oil is transferred to the backside of the receiver sheet from the pressure roller. Under such a situation, during duplex printing, when the sheet is reversed for printing on the backside, fuser oil will be transferred to the surface of the intermediate substrate from the backside. The oil transfer is worse in the non-image areas compared to the image areas where the toner is present.

When a large number of sheets are duplex printed, the quantity of the oil transferred to the intermediate substrate increases causing the surface energy of the oil bearing areas on the intermediate substrate to vary, influencing the transfer performance of the toner. This results in the appearance of ghost images in subsequent sheets and other artifacts such as oil streaks.

Having a backside for the print media that is porous and retains the fuser oil reduces imaging artifacts as described above. The backside may also be a regular clay coating as in the commercially available clay coated papers without a resin coating. The backside can also be formulated such that it can additionally be receptive to inkjet printing. In a preferred embodiment the backside is coated with calcium carbonate in a binder such as poly(vinyl alcohol) in order to enable inkjet printing and writability.

It is also preferable that the print media of this invention has a volume resistivity of the element as measured through its thickness, substantially greater than $1\times10^{12}$ ohm-cm and the internal resistivity of the element is greater than $1\times10^{10}$ ohm/square.

When using a media as described herein, consisting of a base, especially a paper base and thermoplastic resin layers coated on either side of the base, as described above, it has been found that, when transporting said media in a NexPress 2100, that there is a failure in the electrostatic tackdown process to a dielectric transport belt if the internal resistivity of the media, as measured in the plane of the media, is below $1\times10^{10}$ ohm/square, even though the volume resistivity through the thickness of the media is substantially greater than $1\times10^{12}$ ohm-cm. Surprisingly, it is found that if the internal resistivity of the media is increased to $3.2\times10^{10}$ ohm/square or greater, for example, by drying the media so as to reduce the moisture content of the paper core, then reliable tackdown and transport is observed.

It is believed that when the internal resistivity of the media is below $1\times10^{10}$ ohm/square, then the static dissipative core can allow for charge redistribution within the core in response to both the tackdown charge deposited on exposed layers and the proximity of the electrically grounded, conductive guides in the printer, resulting in a strong electrostatic attractive force between the media and the guides. This force of attraction creates a tangential drag force opposing the frictional pull force arising from the electrostatic tackdown of the media to the transport belt. This tangential drag force can be of sufficient magnitude so as to overwhelm the tackdown pull force, preventing good electrostatic adhesion of the media to the belt and causing transport failures. However, when the internal resistivity of the media is above $1\times10^{10}$ ohm/square or greater, more preferably above $3.2\times10^{10}$ ohm/square, then the charge redistribution within the media is greatly reduced, thereby greatly reducing the tangential drag force and enabling reliable tackdown and transport of the media. While this problem has been described with reference to transport in the NexPress 2100 electrophtographic printer, it will find use with other printing systems such as ink jet, flexographic, or any other cut-sheet image process where electrostatic tackdown is utilized with the media of this invention.

The preferred electrographic and electrophotographic processes and their individual steps have been well described in detail in many books and publications. The processes incorporate the basic steps of creating an electrostatic image, including charging and exposing a photoconductor, developing that image with charged, colored particles (toner), optionally transferring the resulting developed image to a secondary substrate, such as a cylinder with a rubber-like soft-elastic surface or a rubber blanket, and then transferring onto a final substrate or receiver and fixing or fusing the image onto the receiver. In terms of environmental stability and extending image quality, the intermediate transfer method is more desirable. The final receiver sheet of the invention can have a toner receiver layer designed to receive the toner particles.

The toner used with the print media herein contains, for example, a polymer (a binder resin), a colorant and an optional releasing agent.

As the polymer, known binder resins are useable. Concretely, these binder resins include homopolymers and copolymers such as polyesters, styrenes, e.g. styrene and chlorostyrene; monoolefins, e.g. ethylene, propylene, butylene and isoprene; vinyl esters, e.g. vinyl acetate, vinyl propionate, vinyl benzoate and vinyl butyrate; α-methylene aliphatic monocarboxylic acid esters, e.g. methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers, e.g. vinyl methyl ether, vinyl ethyl ether and vinyl butyl ether; and vinyl ketones, e.g. vinyl methyl ketone, vinyl hexyl ketone and vinyl isopropenyl ketone. Particularly desirable binder resins include polystyrene resin, polyester resin, styrene/alkyl acrylate copolymers, styrene/alkyl methacrylate copolymers, styrene/acrylonitrile copolymer, styrene/butadiene copolymer, styrene/maleic anhydride copolymer, polyethylene resin and polypropylene resin. They further include polyurethane resin, epoxy resin, silicone resin, polyamide resin, modified rosin, paraffins and waxes. Of these resins, styrene/acryl resins and bisphenol A polyesters are particularly preferable.

As the colorants, known colorants can be used. The colorants include, for example, carbon black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1 and C.I. Pigment Blue 15:3. The colorant content is, for example, 2 to 8% by mass. When the colorant content is 2% or more by mass, a sufficient coloring power can be obtained, and when it is 8% or less by mass, good transparency can be obtained.

The toner utilized with the receiver of the present invention optionally contains a releasing agent. The releasing agents preferably used herein are waxes. Concretely, the releasing agents usable herein are low-molecular weight polyolefins such as polyethylene, polypropylene and polybutene; silicone resins which can be softened by heating; fatty acid amides such as oleamide, erucamide, ricinoleamide and stearamide; vegetable waxes such as carnauba wax, rice wax, candelilla wax, Japan wax and jojoba oil; animal waxes such as bees wax; mineral and petroleum waxes such as montan wax, ozocerite, ceresine, paraffin wax, microcrystalline wax and Fischer-Tropsch wax; and modified products thereof. When a wax containing a wax ester having a high polarity, such as carnauba wax or candelilla wax, is used as the releasing agent, the amount of the wax exposed to the toner particle surface is inclined to be large. On the contrary, when a wax having a low polarity such as polyethylene wax or paraffin wax is used, the amount of the wax exposed to the toner particle surface is inclined to be small.

Irrespective of the amount of the wax inclined to be exposed to the toner particle surface, waxes having a melting point in the range of 30 to 150° C. are preferred and those having a melting point in the range of 40 to 140° C. are more preferred.

The wax is, for example, 0.1 to 10% by mass, and preferably 0.5 to 7% by mass, based on the toner.

The toner used with the receiver of the present invention may contain an additive. Fine powders of inorganic compounds and fine particles of organic compounds are used as the additive. Fine particles of the inorganic compounds are those of, for example, $SiO_2$, $TiO_2$, $Al_2O_3$, CuO, ZnO, $SnO_2$, $Fe_2O_3$, MgO, BaO, CaO, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$ and $MgSO_4$. The fine particles of organic compounds are those of fatty acids and derivatives thereof and metal salts thereof, and also those of resins such as fluororesins, polyethylene resins and acrylic resins.

The average particle diameter of the toner used in the present invention is, for example, 3 to 15 micrometers, preferably 4 to 10 micrometers. The storage elastic modulus G' of the toner per se (determined at an angular frequency of 10 rad/sec) at 150° C. is preferably in the range of 10 to 200 Pa for good fusing.

The following examples illustrate the practice of this invention. They are not intended to be exhaustive of all possible variations of the invention. Parts and percentages are by weight unless otherwise indicated.

EXAMPLES

The low density polyethylene (LDPE) resin used in the examples below was obtained from Voridian, an operating division of Eastman Chemical Company. The LDPE resins used were (SP2207 811A that has a melt index (measured by ASTM D1238) of 20, and D4042-P that has a melt index of 10 as Voridian 811, a 20 MFI resin. Ethylene methyl acrylate (EMA) used in the examples was also obtained from Voridian, and from Exxon Mobil. The EMA used were SP2207 (from Voridian), which had a melt index of 6 and a 20% methyl acrylate content; and Optema TC130 (from Exxon Mobil) which had a methyl acrylate content of 21.5% and a melt index of 20.

Talc (HTP1C) was purchased from Imi Fabi. Porous silica particles, Gasil 23D, Gasil 23F (6 micrometers) and Gasil HP39 (10 micrometers) were obtained from Ineos. A maleic anhydride polypropylene (maleated polyolefin), Orevac CA100, was obtained from Arkema group (previously known as Atofina chemicals)and ethylene methyl acrylate TC130 with a 21.5% methyl acrylate content from Exxon Mobil. Bynel 4288, an anhydride modified low density polyethylene was purchased from DuPont. An amorphous grade of poly lactic acid (PLA 8300D) was obtained from Nature Works. Acrawax C, which is N,N'-ethylene bistearamide, a plasticizer was obtained from Lonza Inc. Aquazol 50, poly(ethyloxazoline), was obtained from Polymer Chemistry Innovations. Polymeric (crosslinked methyl methacrylate) matte particles (9 micrometers) were prepared using standard suspension polymerization methods. Colloidal silicas, Aerosil 200 and Ludox AM, average particle diameter 12 nm, for the second exposed layer, were purchased from Aerosil and DuPont respectively. The latex (L) used as a binder for the Aerosil was styrene-co-butylmethacrylate-co-sodium2-sulfoethylmethacrylate in the ratio of 30/60/10 as described in Table I (column 4) of U.S. Pat. No. 5,244,728. The polyester binder used in the examples as another binder for the silica was a polyester ionomer, AQ55, purchased from Eastman Chemical Company. A defoamer Surfynol DF210 was obtained from Air Products and Chemicals, Inc.

All the samples were created using a resin coating machine. This machine was operated at melt temperatures in the range 210° C.-337.8° C. The temperatures were adjusted based on requirements of adhesion to paper raw base, width of coating as well as restrictions imposed by resin degradation. The resins used have been characterized for rheology—viscosity using a rheometer and melt flow index (MFI). Melt flow index (MFI) is measured using ASTM D1238, for polyethylenes it translates to measurements made at 190° C. under a load of 2.16 kg. Electrophotographic printing was done in the NexPress 2100 printer. Glossing of the printed samples were done using a glosser that consisted of a belt fuser which used a 76.2 micron polyimide belt. This belt was set at a temperature of between 140 and 170° C. Gloss measurements (60°) were made samples using a BYK Gardner Glossmeter in the Dmin(white) and Dmax(black) areas.

Adhesion of the printed colorant material to the media was measured using a commercial Microscratch Test Device developed and produced by CSM Instruments (Neuchatel, Switzerland). All samples were conditioned for 18 hours at 23° C./50% RH prior to testing. After this conditioning period, ramped load scratches were generated in the 3-300 gram load range in imaged areas using an angled Silicon Carbide cylinder with a 5 μm edge radius as the abrader. The cylinder was held at a fixed angle of 45 degrees relative to the surface of the sample in all cases in order to reduce downward penetration of the cylinder edge and enhance shear forces in interfacial regions. A scratch velocity of 10 mm/minute and a loading rate of 297 grams/minute were used in all cases. After scratch generation was complete, an optical microscope was used to examine scratch morphologies and determine the load required to initiate color removal, which was used as a measure of toner layer durability (adhesive and cohesive) and interlayer adhesion within the media structure.

The contact angle of water to the substrate was measured using a model 2500 contact angle goniometer produced by Advanced Surface Technology, Inc., a.k.a. AST, 9 Linnell Circle, Billerica, Mass. The water used was reagent grade distilled water obtained from Aldrich Chemical Company, Milwaukee, Wis.

A droplet was formed on the end of a specially manufactured needle, produced by AST and the substrate slowly raised until the droplet just came into contact with the substrate. The substrate was then lowered until the droplet broke contact with the needle and a digital image of the droplet on the substrate was immediately snapped, using AST supplied software. The contact angles were then measured by fitting a curve to the circumference of the drop of deionized water, again using AST supplied software.

Examples 1 and 2

For Example 1, a 160 μm thick photographic paper was extrusion coated one both sides (one side of which served as the first exposed layer) with a polymer melt containing 20 weight % polylactic acid, 64.7 weight % LDPE, 7.5 weight % maleated polyolefin and 7.5 weight % talc. The total resin coating coverage on each side was maintained at 21.97 gM/m$^2$. For Example 2, another sample was made in a similar manner except that the polymer melt contained 10 weight % poly(ethyloxazoline), Aquazol 50, 77.5 weight % LPDE (Voridian 811, a 20 MFI resin), 5% compatibilizer (Bynel 4288), and 7.5 weight % silica (Ineos Gasil 23D). The total resin coating coverage was maintained at 21.97 gm/m$^2$. On the second resin coated side of both the Examples described above, an aqueous inorganic coating was coated comprising an aqueous dispersion of Aerosil 200, the latex L, Surfynol DF and matte particles such that the dry coverages were 80, 20, 0.11 and 20 mg/ft$^2$ respectively to create the second exposed layer on the second side of the papers. The print media thus obtained were printed on both sides in the NexPress 2100 and the advancing contact angle on both sides of the printed and unprinted media were measured as described earlier. The results are shown in Table 1.

TABLE 1

| Example | Layer characterized | Printed | Contact angle |
|---|---|---|---|
| 1 | First exposed | No | 107 |
| 1 | First exposed | Yes(glossed) | 104 |

TABLE 1-continued

| Example | Layer characterized | Printed | Contact angle |
|---|---|---|---|
| 1&2 | Second exposed | No | 0 (water absorbed too quickly to measure) |
| 1&2 | Second exposed | Yes | 60 |
| 2 | First exposed | No | 98 |

Table 1 shows that, the second exposed side for Examples 1 and 2 is hydrophilic as a result of the inorganic coating on it and has a contact angle less than 90 degrees even after printing, whereas the first exposed side for Examples 1 and 2 has a contact angle greater than 90 degrees, indicating a hydrophobic surface in spite of the hydrophilic component poly (ethyloxazoline) present in the first exposed layer of Example 2.

Example 3

A polyethylene resin melt containing 11.4 wt % $TiO_2$, 87.7 wt % LDPE, and 0.9 wt % of a mixture of colorants, optical brighteners and antioxidants, was extrusion coated on both sides of a 160 μm thick photographic paper support at 288-332° C. The resin coating coverage was 24.43 gm/$m^2$. On one side of the resultant media, the second exposed side was created by a coating similar to that described in Example 1 except that the composition was as follows: Aerosil 200 45 mg, Ludox AM 45 mg, AQ 55D 10 mg and matte 20 mg/ft2. The media was printed on both sides in a NexPress 2100 and evaluated for pen writability.

The instrument used for pen writability evaluation consisted of an arm holding a ballpoint pen at a 55° angle to the surface of the paper. 250 grams of weight were applied to the arm while it touched the paper and the arm was drawn across the paper attempting to create a 1 inch line. The pen was then lifted and moved to another spot and the process repeated 10 times. The lines were then evaluated for skips. A sample that had good writability would show no skips for all the lines. Table 2 shows the results from these tests.

TABLE 2

| Example | Layer tested | Lines with no skips |
|---|---|---|
| 3 | Second exposed | 10 |
| 1 | Second exposed | 10 |
| 1(Check) | First exposed | 0 |

Table 2 shows that the backside of the print media bearing the silica coated second layer exposed is writable but without the coating the media (Example 1) is not writable with a ball point pen.

Examples 4 and 5

A paper base of composition and caliper described in Example 1, was extrusion coated on both sides to create the first exposed layer. The total resin coating coverage was 21.97 gM/$m^2$. The image receiving layer composition consisted of a blend of 14 weight % ethylene methyl acrylate with 67 weight % LDPE4002P/4042, 14 weight % $TiO_2$, 4 weight % talc and colorants, antioxidants and optical brighteners. The surface finish of the resin coated paper was controlled to a matte finish, by the finish on the chill roll used in the extrusion process. The resultant print media was printed on the first exposed side in a Hewlett-Packard Indigo 3000 printer (liquid electrophotgraphy) and compared to a commercially available paper (Lustro Gloss 216) printed the same way. The print media was also printed on the first exposed side in a Heidelberg Speedmaster (offset press) using a silicone based ink. This was compared against a standard paper used in the offset industry. Examples 4 and 5 were also glossed using a belt fuser as described earlier and the gloss measured before and after the glossing process. The check papers could not be glossed using the glosser. Colorant adhesion to the media was measured using the tape adhesion test that was performed by placing a piece of 3M 2600 tape on a 100% black patch. The tape was rolled once with a rubber roller weighing 5 lbs. The tape was peeled at a 180° angle using a slow, steady pull. The paper was then observed visually and given a percentage removal number based on the amount of colorant removed. As Table 3 shows, Examples 4 and 5 glossed to an image with little differential gloss and an absolute number 60° Gardner gloss value greater than 60. Using the same papers as in Examples 4 and 5, both matte and glossy finished prints on the first exposed layer could be produced without additional coatings or lamination, whereas the standard commercially available paper could not be converted to a glossy print without the use of additional material such as an overcoat. The adhesion of the colorant material to the media was comparable to or better than the standard papers used currently.

TABLE 3

| Example (Layer printed) | Printing method | Glossed | Tape adhesion (percent ink removal) | 60° Gloss (Dmin) | 60° Gloss (Dmax) |
|---|---|---|---|---|---|
| 4 (first exposed) | Liquid EP | No | 0 | 3.6 | 8.1 |
| 4 (first exposed) | Liquid EP | Yes | 0 | 71.1 | 76.7 |
| Lustro Gloss (check) | Liquid EP | Not uniformally glossable | 10 | 34.8 | 21.8 |
| 5 (first exposed) | Offset | No | 0 | 17.2 | 31.7 |
| 5 (first exposed) | Offset | Yes | 0 | 86.3 | 93.2 |
| Standard stock (check) | Offset | Not glossable | 0 | 21 | 35 |

Example 6

The media as described in Examples 4 and 5 was printed in the NexPress 2100 on the first exposed layer and subsequently belt fused to a high gloss print. Ra (Roughness Average), the arithmetic average height calculated over the entire measured array, was measured using the WYKO NT2000 system. Table 4 shows the surface roughness obtained before and after glossing.

TABLE 4

| Surface | Dmin 60° gloss | Surface Roughness Ra (μm) |
|---|---|---|
| Printed and Unglossed | 21 | 0.44 |
| Printed and Glossed | 78 | 0.09 |

As can be see from Table 4 the surface roughness decreases significantly after glossing the print. This is also reflected in the 60° gloss values that show the printed media's ability to be transformed into a glossy image from a matte surface. Using a single media, it is possible as Example 6 shows to obtain a gloss or matte output depending on the final application of the print.

Examples 1-3, 7-10

In Example 7, a base paper as described in Example 1 was coated both sides with a blend of 90 weight % LDPE (Voridian 4042P, a 10 MF1 resin) and 10 weight % silica (Gasil 23F, 6micrometers). The total resin coating coverage on each side was maintained at 23 gm/m$^2$. In Example 8, the blend used was 92.5 weight % LDPE and 7.5 weight % silica and the total resin coating coverage on each side was 21 gm/m$^2$. In Example 9, the blend used was the same as in Example 8 except that the silica used was 10 micrometers in size (Gasil HP39) and the total resin coating coverage on each side was 15 gm/$^2$. In Example 10, a blend of 10 weight % ethylene methyl acrylate (Voridian SP2207) with 70.2 weight % low density polyethylene (Voridian 4042P), 1 weight % Acrawax (esteramide), 8.4 weight % talc (Imi Fabi HTP1C), 9.8 weight % $TiO_2$ and colorants, antioxidants and optical brighteners was melt extrusion coated on both sides of a base paper as described in Example 1. On the first exposed layer of Examples 1-3, 7-10 was printed a black patch containing cyan, magenta, yellow, and black toners in the NexPress 2100. The samples were then glossed as described earlier and the toner adhesion measured using a scrape adhesion test described above.

TABLE 5

| Example (first exposed layer) | Additive in First Exposed Layer | Scrape Adhesion Onset (grams) |
|---|---|---|
| 1 | Polylactic acid | 69 |
| 2 | Polyethyl oxazoline | 62 |
| 3 | None | 27 |
| 7 | Silica (6 μm) | 60 |
| 8 | Silica (6 μm) | 57 |
| 9 | Silica (10 μm) | 45 |
| 10 | Esteramide | 37 |

As Table 5 shows the adhesion of colorant to the first exposed layer can be improved with the use of additives such as polylactic acid, polyethyl oxazoline, silica, and polyester amides. The onset to failure in the scrape adhesion test is higher for all the exposed layers containing the above additives compared to Example 3, which did not contain the additive.

Examples 11-12

In Example 11, a polyethylene resin melt containing 11.4 weight % $TiO_2$, 87.7 weight % LDPE, and 0.9 weight % of a mixture of colorants, optical brighteners and antioxidants, was extrusion coated on both sides of a 160 μm thick photographic paper support at 288-332° C. On one side of the resultant media, the second exposed side was created, by a coating similar to that described in second exposed layer of Example 1. In Example 12 is a paper base of composition and caliper described in Example 1, was extrusion coated on both sides to create the first exposed layer. The total resin coating coverage was 21.97 gm/m$^2$. The first exposed layer composition consisted of a blend of 14 weight % ethylene methyl acrylate with 67 weight % LDPE 4042, 14 weight % $TiO_2$, 4 weight % talc and colorants, antioxidants and optical brighteners. The check used was a clay coated Lustro Gloss 216 gsm paper.

TABLE 6

| Example | Description of Second Side | Oil Streak Visibility |
|---|---|---|
| Lustro Gloss 216 gsm(check) | Clay Coated | Slight |
| 11 | Silica containing second exposed layer | Slight |
| 12 | No silica in second exposed layer | Easily visible |

The papers were printed in the NexPress 2100 in a duplex mode to test for silicone fuser oil contamination resulting from oil present on the backside of the paper after printing the first side. The printing was done such that the second exposed layer was printed second. When the fuser oil is not retained by the backside, it is introduced back into the imaging modules of the press during printing of the backside in duplex mode. The amount of oil introduced to the press by the media during duplex printing was evaluated by printing 36 sheets of the media, using a black and white striped image and immediately thereafter printing on standard clay coated paper, large black and gray patches (flat fields), and examining the patches for oil streaks and other image artifacts caused by the residual oil transferred from the backside of the previously printed duplex job onto the imaging modules of the printer. Standard clay coated papers usually show a low level of oil streaks and other artifacts in this test. Plastic media that cannot manage the fuser oil show highly visible oil streaks in the flat fields. As Table 6 shows silica coating of the second exposed layer, Example 11, behaves like standard clay coated paper in minimizing oil contamination from the second side in a two sided printing operation. Example 12 without the silica coating does not retain the fuser oil as well and contaminates the machine giving rise to streaks and image artifacts.

The invention has been described in detail with particular reference to certain preferred embodiments thereof, but it will be understood that variations and modifications can be effected within the spirit and scope of the invention.

The invention claimed is:

1. A printing media comprising a first side comprising a first exposed layer comprising a mixture of polyolefin and at least one member selected from the group consisting of polyolefin copolymers, amide containing polymers, and ester containing polymers, wherein a resin component of said first exposed layer has a $T_g$ of less than 5° C. and a second side comprising a second exposed layer having an advancing contact angle with water of less than 90°, wherein said first exposed layer further comprises a poly(hydroxy acid) or a hydrophilic component selected from the group consisting of polymers derived from polyvinyl alcohol and polyethyloxazoline.

2. The printing media of claim 1 wherein said first exposed layer is hydrophobic.

3. The printing media of claim 2 wherein said first exposed layer comprises a hydrophilic component selected from the group consisting of polymers derived from polyvinyl alcohol and polyethyloxazoline.

4. The printing media of claim 1 wherein said first exposed layer comprises a poly(hydroxy acid).

5. The printing media of claim 4 wherein said poly(hydroxy acid) is a lactic acid polymer.

6. The printing media of claim 1 wherein said first exposed layer further comprises a low molecular weight plasticizer component.

7. The printing media of claim 6 wherein said low molecular weight plasticizer component comprises an amide or ester wax.

8. The printing media of claim 1 wherein said first exposed layer comprises an inorganic additive.

9. The printing media of claim 8 wherein said inorganic additive comprises silica.

10. The printing media of claim 1 wherein said printing media has a 60° gloss greater than 60 in non-imaged areas after belt fusing or calendaring of said media.

11. The printing media of claim 1 wherein said first exposed layer has a thickness of between 10 micrometers and 30 micrometers.

12. The printing media of claim 1 wherein said first exposed layer has an average surface roughness of between 0.3 and 5 micrometers prior to glossing.

13. The printing media of claim 1 wherein first exposed layer of said printing media has a surface roughness of between 0.01 and 0.2 micrometers after glossing.

14. The printing media of claim 1 wherein said second side has an advancing contact angle with water of between 0 and 90 degrees.

15. The printing media of claim 1 wherein the second side exposed layer comprises inorganic particles.

16. The printing media of claim 15 wherein the said inorganic particles comprise silica.

17. The printing media of claim 15 wherein the said inorganic particles comprise clay.

18. The printing media of claim 15 wherein the said inorganic particles comprise a mixture of inorganic particles.

19. The printing media of claim 15 wherein the said inorganic particles have a size range of between 5 and 500 nanometers.

20. The printing media of claim 1 wherein the second exposed layer is porous.

21. The printing media of claim 1 wherein the said first side and second side are coated on a base selected from one member of the group consisting of paper, resin coated paper, coated paper, synthetic paper, polyolefin film and polyester film.

22. The printing media of claim 1 wherein the second exposed layer comprises a thermoplastic binder.

23. The printing media of claim 1 wherein the second exposed layer comprises a thermoplastic binder selected from at least one member of the group consisting of polyurethanes, polyesters, and vinyl copolymers.

24. The printing media of claim 1 wherein the second exposed layer has inorganic particles in an amount of between 50 and 99 percent by weight of said layer.

25. The printing media of claim 1 wherein the second exposed layer has a dry coverage of between 0.1 and 5 $g/m^2$.

26. The printing media of claim 1 wherein the second exposed layer has matte particles.

27. The printing media of claim 1 wherein the second side exposed layer further comprises a lubricant.

28. The printing media of claim 1 wherein the second exposed layer has the ability to retain silicone oil.

29. The printing media of claim 1 wherein the second exposed layer after printing has a surface having the ability to create a one inch line without skips using a ball point pen and a 250 g load.

30. A printing media comprising at least one side comprising a first exposed layer comprising a mixture of polyolefin and at least one member selected from the group consisting of polyolefin copolymers, amide containing polymers, and ester containing polymers, wherein a resin component of said exposed layer has a $T_g$ of less than 5° C. wherein said exposed layer further comprises a poly(hydroxy acid) or a hydrophilic component selected from the group consisting of polymers derived from polyvinyl alcohol and polyethyloxazoline.

31. The printing media of claim 30 wherein said first exposed layer is hydrophobic.

32. The printing media of claim 30 wherein the at least first side is coated on a base selected from one member of the group consisting of paper, resin coated paper, coated paper, synthetic paper, polyolefin film and polyester film.

33. The printing media of claim 30 wherein said first exposed layer further comprises a low molecular weight plasticizer component.

34. The printing media of claim 33 wherein said low molecular weight plasticizer component comprises an amide or ester wax.

35. The printing media of claim 30 wherein said first exposed layer comprises an inorganic additive.

36. The printing media of claim 35 wherein said inorganic additive comprises silica.

37. The printing media of claim 30 wherein said printing media has a 60° gloss greater than 60 in non-imaged areas after belt fusing or calendaring of said media.

38. The printing media of claim 30 wherein said first exposed layer has a thickness of between 10 micrometers and 30 micrometers.

39. The printing media of claim 30 wherein said first exposed layer has an average surface roughness of between 0.3 and 5 micrometers prior to glossing.

40. The printing media of claim 30 wherein first exposed layer of said printing media has a surface roughness of between 0.01 and 0.2 micrometers after glossing.

41. A printed media comprising a printing media according to claim 1, wherein at least the first exposed layer has an image thereon formed from an electrostatic imaging process.

42. A printed media of claim 41 wherein said image is formed from an electrostatic imaging process comprising forming an image on a first surface utilizing a liquid toner and transferring the image to the said first or second exposed layer and fixing the image thereon.

43. A printed media comprising a printing media according to claim 1, wherein at least the first exposed layer has an image thereon formed by a printing process selected from the group consisting of offset printing, screenprinting, flexographic printing, gravure and inkjet printing.

44. A printed media of claim 43 wherein said image is formed from an offset lithographic printing process comprising forming an image on a first plate surface utilizing a liquid printing ink, transferring the inked image to an intermediate blanket and transferring the image again onto one or both sides of a print media comprising at least one exposed layer.

45. A printed media comprising a printing media according to claim 1, wherein said at least one exposed layer has an image thereon formed from toner comprising pigment and bisphenol A polyester.

46. A printed media comprising a printing media according to claim 30, wherein at least the first exposed layer has an image thereon formed from an electrostatic imaging process.

47. A printed media of claim 46 wherein said image is formed from an electrostatic imaging process comprising forming an image on a first surface utilizing a liquid toner and transferring the image to the said first exposed layer and fixing the image thereon.

48. A printed media comprising a printing media according to claim 1, wherein at least the first exposed layer has an image thereon formed by a printing process selected from the group consisting of offset printing, screenprinting, flexographic printing, gravure and inkjet printing.

49. A printed media of claim 48 wherein said image is formed from an offset lithographic printing process comprising forming an image on a first plate surface utilizing a liquid printing ink, transferring the inked image to an intermediate blanket and transferring the image again onto one or both sides of a print media comprising at least one exposed layer.

50. A printed media comprising a printing media according to claim 1, wherein said at least one exposed layer has an image thereon formed from toner comprising pigment and bisphenol A polyester.

51. A printing media of claim 1, wherein the volume resistivity of the media as measured through its thickness is substantially greater than $1\times10^{12}$ ohm-cm and the internal resistivity of the media is greater than $1\times10^{10}$ ohm/square.

52. A printing media of claim 30, wherein the volume resistivity of the media as measured through its thickness is substantially greater than $1\times10^{12}$ ohm-cm and the internal resistivity of the media is greater than $1\times10^{10}$ ohm/square.

* * * * *